United States Patent [19]

Disinski

[11] 4,148,223
[45] Apr. 10, 1979

[54] METHOD AND APPARATUS FOR MEASURING THE TEMPERATURE OF A GLASS CONTAINER

[75] Inventor: Francis J. Disinski, Reynoldsburg, Ohio

[73] Assignee: Abbott Laboratories, North Chicago, Ill.

[21] Appl. No.: 780,891

[22] Filed: Mar. 24, 1977

[51] Int. Cl.² .......................... G01K 7/02; G01K 7/14
[52] U.S. Cl. .................................... 73/359 R; 73/360
[58] Field of Search ............... 73/343 B, 359 R, 15 B, 73/17 A, 17 R, 15 R, 15 A, 15 FD, 339 R, 342, 343 R, 343 B, 343.5, 354, 359, 360, 361, 362.3; 21/83, 92, 93, 103; 29/589, 613, 621, DIG. 1; 329/201; 141/85, 89, 92

[56] References Cited

U.S. PATENT DOCUMENTS

| 880,272 | 2/1908 | Bristol | 73/359 X |
| 2,127,845 | 8/1938 | Ryder | 73/360 X |
| 3,173,288 | 3/1965 | Davis et al. | 73/17 R |
| 3,298,220 | 1/1967 | Stone et al. | 73/15 B |
| 3,737,982 | 6/1973 | Calhoun et al. | 73/359 R X |
| 3,828,833 | 8/1974 | Smith et al. | 141/85 |
| 3,957,475 | 5/1976 | Schwenninger et al. | 73/351 X |
| 3,981,196 | 9/1976 | Zeuch et al. | 73/343 B |

FOREIGN PATENT DOCUMENTS 790660  2/1958  United Kingdom .................. 73/359 R

OTHER PUBLICATIONS

"Precision Fine Wire Thermocouples," Bulletin 463 (revised), Omega Engineering Inc., Jul. 1966.
"Complete Thermocouple Assemblies," Bulletin #1075 of Omega Engineering Incorporated, Jul. 1966.

Primary Examiner—Donald Watkins
Attorney, Agent, or Firm—Robert L. Niblack; Neil E. Hamilton

[57] ABSTRACT

A method and apparatus for measuring the surface temperature of a glass ampul which allows for the temperature to be determined as a function of time. The apparatus utilized is a thermocouple with the lead wires directly secured to the inside or outside surface of the glass ampul. Contact is assured by utilizing a high-temperature-resistive cement to secure the measuring function to the glass surface. To assure accurate temperature measurement, the lead wires are of a thin type and are uninsulated. The thermocouple wires opposite their junction are secured to a connector and ultimately to a thermocouple amplifier. If desired, a recorder is operatively connected to the amplifier. The temperature measuring apparatus allows for a constant temperature reading as the ampul is sterilized in a sterilizer and thus assures that complete sterilization is effected.

14 Claims, 2 Drawing Figures

METHOD AND APPARATUS FOR MEASURING THE TEMPERATURE OF A GLASS CONTAINER

BACKGROUND OF THE INVENTION

This invention relates to a method and apparatus for determining the sterilization of a container. More particularly, this invention relates to a method and apparatus for determining the temperature of the inside surface of an ampul as a function of time as the ampul is placed inside a direct flame sterilizer. Presently, there is no accurate means of measuring the temperature inside a glass container, such as an ampul, when the container is placed in a sterilizer. This is particularly true when the temperature is desired to be known as a function of time or location in the ampul. One of the techniques which is known in the art is to utilize a thermal melting paint or tablets which are sensitive to heat. However, this technique not only requires visual observation at the point of melt but does not allow for a permanent time versus temperature measurement to be made on a continuous basis. In the sterilization of glass containers such as ampuls, it is essential that the temperature of the inside glass surface be known to assure that sterilization of the ampul is accomplished. Otherwise, the container can possibly contaminate any otherwise sterile product which is placed in the container.

It is an advantage of the present invention to afford a method and apparatus for accurately determining the temperature of the inside surface of a glass container. Other advantages are a method and apparatus which can determine the temperature of the inside surface of an ampul as both a function of time or location in the ampul; an apparatus which will give a continuous temperature reading of an ampul as it is passed through a direct flame sterilizer; an apparatus which utilizes readily available equipment and can be placed in contact with a glass ampul without the need of special equipment; a method for determining sterilization of an ampul which can be performed without the need of skilled labor and by means of readily available equipment.

SUMMARY OF THE INVENTION

The foregoing advantages are accomplished and the shortcomings of the prior art are overcome by the present method for measuring the surface temperature of a glass container such as an ampul for sterile liquids wherein the junction of bare and substantially thin thermocouple lead wires are directly secured to the inside surface of the ampul. The bare lead wires are maintained separate from each other and are connected at the opposing ends to a thermocouple amplifier. The ampul with the lead wires attached is then placed in a sterilizer which will give a reading of the surface temperature of the ampul as a function of time that the ampul is in the sterilizer. The lead wires are utilized in a bare and uninsulated condition and are of a substantially thin type. The junction of the lead wires is placed in direct contact with the ampul surface and secured thereto by means of a high-temperature-resistive adhesive. The opposing ends of the lead wire are connected to a thermocouple amplifier which in turn is interconnected to a recorder means. Preferably, a connector will interconnect the thermocouple lead wires to the lead wires of the thermocouple amplifier. As indicated in the previously described method, the measuring apparatus best suited for accomplishing the method is a bare or uninsulated thin wire thermocoupled unit wherein the wire size is preferably 0.003–0.005 inches in diameter. Preferably a Chromel-Alumel lead wire thermocouple is utilized. The adhesive which is utilized to place the thermocouple junction in direct contact with the glass is of a porcelain type, being high-temperature-resistive and preferably containing silicates. In a preferred manner, the lead wires are separated from each other at the opening of the ampul by an additional amount of high-temperature-resistive cement material. The lead wires are then connected to a thermocouple amplifier by means of a two-component, separable, independent, thermocouple connector and a recorder is operatively connected to the amplifier.

DESCRIPTION OF THE DRAWING

A better understanding of the present surface temperature measuring device and temperature measuring method will be accomplished by reference to the drawing wherein.

DESCRIPTION OF ONE EMBODIMENT

Figures 1, 2:
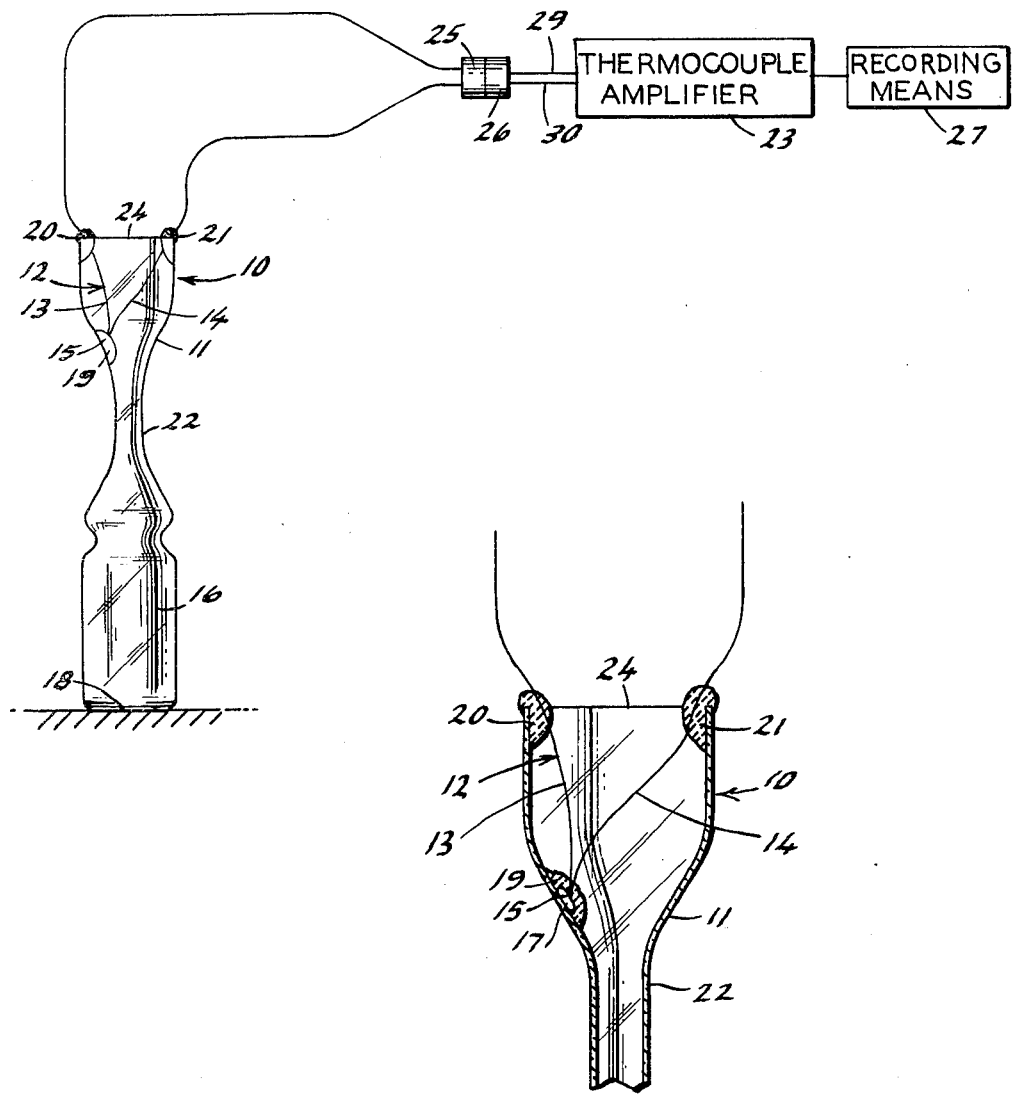
FIG. 1 is a view in side elevation showing a thermocouple sensing device secured to an ampul and interconnected to a thermocouple amplifier and a recorder.
FIG. 2 is a partial, enlarged view of FIG. 1 showing the connection of the electrode wires to the ampul.

Proceeding to a detailed description of the present invention, the measuring apparatus 10 is utilized in conjunction with the usual ampul 11 for hermetically containing sterile liquids and solutions for I.V. administration. The ampul has a base portion 16 with a bottom 18, a neck 22 forming a continuous inside surface and funnel or open end portion 24. A thermocouple 12 having two thermocouple lead wires 13 and 14 are preferably of a Chromel-Alumel alloy type and have a diameter of 0.005 inch. The leads are joined at 15 and secured to ampul 11 at one end. The opposing ends extend from the ampul and are secured in a male thermocouple connector 25 which in turn is engaged with a separable female connector 26. Insulated thermocouple lead wires 29 and 30 extend from connector 26 to a thermocouple amplifier 23 which is of the standard type and in this instance is a Brush model 13–4312-10 amplifier available from Gould, Inc., subsidiary of General Electric, 2379 John Glenn Drive, Chamblee, Ga. 30341. If desired, a recording means 27 is interconnected with the thermocouple amplifier. Recording means 27 is also of a commercially available type under the designation Gould-Brush 260 Recorder model 15-6367-00 from Gould, Inc. at the previously indicated address.

As best seen in FIG. 2, thermocouple leads 13 and 14 are joined in a junction 15 which is secured in direct contact with the inside surface 17 of ampul 11 by means of a portion of adhesive cement 19. In this instance, the cement is of the high-temperature-resistive type containing sodium silicate to form a porcelain-like cement. It is available from Omega Engineering, Inc., Box 4047, Stamford, Conn. 06907. The preferred thermocouple 12 is available from the same source as a K-type thermocouple No. CH AL-005. The connectors 25 and 26 are also available from Omega Engineering as number NMP-CHAL-MF. Insulated thermocouple lead wires 29 and 30 are also obtainable from the same source as lead wire number AHC-K-20.

Referring to FIG. 2, it will be noted that the junction 15 of lead wires 13 and 14 is placed directly in contact with the inside surface 17 of ampul 11. In effect, the junction is encapsulated over the inside glass surface 17 through the use of the adhesive cement 19. This glass to metal contact is critical if a proper temperature determination is to be made. Also of critical importance is the fact that the lead wires 13 and 14 are of a substantially thin diameter so as not to produce a large heat sink effect and adversely affect the temperature reading. Another important feature is the fact that lead wires 13 and 14 are uninsulated so that their sensitivity is not affected. It will be seen that the uninsulated wires 13 and 14 are separated by means of adhesive cement 20 and 21 at the opening or mouth 24 of the ampul. While the lead wires are shown separated from the glass surface 17 of the ampul, it is not important that they be so and can be in contact with it.

OPERATION

A better understanding of the advantages of the temperature measuring apparatus 10 will be had by description of its operation. The lead wires 13 and 14 of the thermocouple 12 will have their junction 15 placed at a selected point on and in contact with the inside glass surface 17 of ampul 11. The contact with the lead wires and ampul 11 will be as basically shown in FIG. 2 with the lead wires interconnected to the amplifier 23 through connectors 25 and 26 as best shown in FIG. 1. For purposes of recording the information, recording means 27 will be interconnected with the amplifier. The measuring unit 10 is now ready to be placed in a sterilizer such as a direct flame ampul sterilizer of the type manufactured by Hodes Lange/Corning as Sterilizer Model APM-123 and available from Corning Glass Works, Corning, N.Y. 14830. Ampul 11 will be positioned in a holding mechanism of the sterilizer with the wires 13 and 14 extending through an opening in the top of the hood. As the ampul travels through the sterilizer, the temperature of the ampul will be known at all times during its time of travel and is of great importance in knowing at what stage an appropriate sterilizing temperature is reached. A typical time and temperature range sequence in the sterilizing unit would be as follows:

| Temperature | Time |
| --- | --- |
| 350° F. | 56–106 - 106 seconds |
| 450° F. | 10–69 seconds |
| 500° F. | 17–49 seconds |
| Peak — 444° -710° F. | |
| Hood Temp. 580° -790° F. | |

The ampuls previous to entering the direct flame sterilizer are rinsed, ultrasonically washed and evacuated. Subsequent to the sterilization, the ampuls are processed in the usual manner with them being filled, flame sealed and then passed through a finishing process.

As indicated earlier, it is essential for accurate temperature readings that the junction 15 of the thermocouple be in direct contact with the glass surface of the ampul and that the lead wires 13 and 14 be of a substantially thin type and uninsulated so that no undue heat sink is created. Further, it is important that the length of leads 13 and 14 not exceed about two feet.

In the description of one embodiment of this invention lead wires 13 and 14 are stated as being of the Chromel-Alumel variety with the Chromel being an alloy composed of 90% nickel and 10% chromium by weight and the Alumel composed of approximately 95% nickel, 2% manganese and 2% aluminum by weight. Other metallic alloys could be utilized such as Chromel-Constantan or Copper-Constantan. Further, while the diameter of the lead wires is specified as being 0.005 inch, the diameter size could range from 0.001 inch to 0.010 inch. Measuring apparatus 10 is shown in FIG. 1 as being connected to amplifier 23 and recorder 27. For convenience purposes, it may be desirable to provide apparatus 10 to include ampul 11 with the attached leads and only the connector 25. The user can then provide connector 26 and the remaining stated amplifier and recorder. It will also be obvious that the measuring junction 15 can be secured directly to either the inside or outside surface of ampul 11.

It will thus be seen that through the present invention there is now provided a method and apparatus which can determine the temperature of the inside of a glass container such as an ampul at various time stages during the sterilization process. The method and apparatus is accurate in its measurement yet employs readily available equipment. No special skills are required for operating the apparatus and the unit can be fabricated with a minimum amount of effort.

The foregoing inveniton can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. An apparatus for measuring the sterilization temperature of a container in a sterilizer comprising:
   an ampul for sterile liquids having bottom and side portions formed from a continuous inside surface and an open end portion;
   at least one pair of bare and substantially thin thermocouple lead wires secured together at one end in a junction and their junction secured in direct contact with said surface of said ampul;
   a thermocouple amplifier;
   means to connect said lead wires at the opposite end to said amplifier; and
   a recording means operatively connected to said thermocouple amplifier;
   so that the surface temperature of said ampul can be measured as a function of time when said ampul is placed in said sterilizer.

2. The apparatus for measuring the surface temperature of a container as defined in claim 1 wherein ampul is glass and and said lead wires are secured at their junction to the inside ampul surface by means of high-temperature-resistive cement.

3. The apparatus for measuring the surface temperature of a glass ampul as defined in claim 2 wherein said high-temperature-resistive cement is of the silicate type.

4. The apparatus for measuring the surface tamperature of a glass ampul as defined in claim 2 wherein said lead wires are further connected independently to said ampul adjacent the open end portion.

5. The apparatus for measuring the surface temperature of a glass ampul as defined in claim 3 wherein said connection means to connect said lead wires to said amplifier is defined by a separable connection means.

6. The apparatus for measuring the surface temperature of a glass ampul as defined in claim 4 wherein said connection means to connect said lead wires to said amplifier includes insulated thermocouple leads.

7. The apparatus for measuring the surface temperature of an ampul as defined in claim 1 wherein said lead wires have a diameter in the range of about 0.001 to about 0.010 inch.

8. The apparatus for measuring the surface temperature of an ampul as defined in claim 6 wherein said lead wires have a maximum length of about two feet.

9. The apparatus for measuring the surface temperature of a glass ampul as defined in claim 2 wherein both said lead wires have a diameter of about 0.005 inch.

10. The apparatus for measuring the surface temperature of a glass ampul as defined in claim 8 wherein one said lead wire is composed of Chromel and said other lead wire is composed of Alumel.

11. A method of measuring the surface temperature of an ampul for sterile liquids in a sterilizer, said ampul having bottom and side portions formed from a continuous inside surface and an open end portion comprising:
    placing the junction of bare and substantially thin thermocouple lead wires directly on the inside surface of said container;
    placing said junction of said thermocouple lead wires in direct contact with said inside surface;
    connecting the ends of said lead wires opposite said junction to a thermocouple amplifier;
    interconnecting a recording mechanism to said thermocouple amplifier; and
    placing said container with said connected lead wires in a sterilizer;
    whereby the surface temperature of said container can be measured as a function of time.

12. The method of measuring the surface temperature of a container as defined in claim 11 wherein said ampul is glass and the ends of said lead wires are connected to said ampul surface by a high-temperature-resistive adhesive.

13. The method of measuring the surface temperature of a glass ampul as defined in claim 10 wherein said lead wires are further connected independently to the ampul adjacent the open end.

14. The method of measuring the surface temperature of a glass ampul as defined in claim 10 including the step of placing an independent connecting means between said opposite ends of said lead wires and said thermocouple amplifier.

* * * * *

UNITED STATES PATENT OFFICE
CERTIFICATE OF CORRECTION

PATENT NO. : 4,148,223
DATED : April 10, 1979
INVENTOR(S) : Francis J. Disinski

It is certified that error appears in the above-identified patent and that said Letters Patent are hereby corrected as shown below:

Column 3, line 45, "56-106 - 106 seconds" should read --56-106 seconds--.

Column 4, line 50, after "wherein" insert --said--.

Column 4, line 51, after "glass" delete "and", first instance.

Column 4, line 57, "tampera-" should read --tempera- --.

Column 4, line 62, after "claim" delete "3" and insert --4--.

Column 4, line 66, after "claim" delete "4" and insert --5--.

Column 5, line 6, after "claim" delete "6" and insert --7--.

Column 5, line 12, after "claim" delete "8" and insert --9--.

Column 6, line 15, after "claim" delete "10" and insert --11--.

Column 6, line 19, after "claim" delete "10" and insert --11--.

Signed and Sealed this

Eleventh Day of September 1979

[SEAL]

Attest:

Attesting Officer

LUTRELLE F. PARKER
*Acting Commissioner of Patents and Trademarks*